US007589524B2

(12) United States Patent
Shoji

(10) Patent No.: US 7,589,524 B2
(45) Date of Patent: Sep. 15, 2009

(54) HEAD SUSPENSION ASSEMBLY, ROTATION DETECTING MECHANISM, AND CONVEYING MECHANISM CAPABLE OF ACCURATELY DETECTING THE CONVEYANCE AMOUNT OF AN OBJECT TO BE CONVEYED

(75) Inventor: Shigeru Shoji, Tokyo (JP)

(73) Assignee: TDK Corporation, Tokyo (JP)

( * ) Notice: Subject to any disclaimer, the term of this patent is extended or adjusted under 35 U.S.C. 154(b) by 538 days.

(21) Appl. No.: 11/290,801

(22) Filed: Dec. 1, 2005

(65) Prior Publication Data

US 2006/0124682 A1 Jun. 15, 2006

(30) Foreign Application Priority Data

Dec. 14, 2004 (JP) ............... 2004-362040

(51) Int. Cl.
 *G01B 7/30* (2006.01)
(52) U.S. Cl. .............. 324/207.25; 324/207.21; 324/173
(58) Field of Classification Search . 324/207.2–207.25, 324/25, 210–212
See application file for complete search history.

(56) References Cited

U.S. PATENT DOCUMENTS

| | | | | |
|---|---|---|---|---|
| 4,678,178 A | * | 7/1987 | Akiyama et al. | ............. 271/242 |
| 5,339,702 A | * | 8/1994 | Viches | ........................ 73/865.9 |
| 5,982,568 A | * | 11/1999 | Yamamoto et al. | ............ 360/31 |
| 5,986,451 A | * | 11/1999 | Kagan | ......................... 324/210 |
| 6,212,045 B1 | * | 4/2001 | Guzik | ....................... 360/255.2 |
| 6,225,799 B1 | * | 5/2001 | Gergel et al. | ................. 324/212 |
| 6,566,870 B2 | * | 5/2003 | Sorenson et al. | ............. 324/210 |
| 6,580,572 B1 | * | 6/2003 | Yao et al. | ........................ 360/25 |
| 7,051,423 B2 | * | 5/2006 | Gouo | ......................... 29/603.03 |
| 7,471,488 B1 | * | 12/2008 | Zhang | ....................... 360/244.5 |

FOREIGN PATENT DOCUMENTS

| JP | A 2001-074499 | 3/2001 |
|---|---|---|
| JP | A 2002-206950 | 7/2002 |

* cited by examiner

Primary Examiner—Jay M Patidar
(74) Attorney, Agent, or Firm—Oliff & Berridge, PLC

(57) ABSTRACT

The present invention provides a conveying mechanism capable of precisely detecting a conveyance amount of an object to be conveyed with a simple configuration. A head suspension assembly includes a suspension having a pair of attachment parts and an arm extending in a U shape so as to connect the pair of attachment parts to each other and showing elasticity in a Z axis direction, and a magnetic sensor provided on the arm. The arm deflects in the Z axis direction in accordance with the magnitude of an external force pressing the magnetic sensor against a recording surface. Even in the case where the recording surface slightly fluctuates in the Z axis direction at the time of conveying operation, the contact state between the magnetic sensor and the recording surface can be maintained in the range that the arm can deflect. Consequently, magnetic information on the recording surface can be precisely read and the rotation amount of a conveying roller can be detected with high precision. Accordingly, the conveyance amount of a sheet can be obtained accurately.

22 Claims, 9 Drawing Sheets

HEAD SUSPENSION ASSEMBLY, ROTATION DETECTING MECHANISM, AND CONVEYING MECHANISM CAPABLE OF ACCURATELY DETECTING THE CONVEYANCE AMOUNT OF AN OBJECT TO BE CONVEYED

BACKGROUND OF THE INVENTION

The present invention relates to a conveying mechanism conveying an object to be conveyed by rotation of a conveying roller, a rotation detecting mechanism mounted on the conveying mechanism and detecting the rotation amount of the conveying roller, and a head suspension assembly used in the rotation detecting mechanism.

Generally, a conveying mechanism for conveying paper or the like is mounted on a printer, a copying machine or the like. In the conveying mechanism, an encoder for controlling rotating operation of a conveying roller for paper feed is provided to control a paper feed position. For example, there is an encoder constructed as follows. A disc in which a plurality of slits are formed is attached to an end of the conveying roller and transmission light leaked from the slits when the disc is irradiated with light is detected by an optical sensor or the like, thereby obtaining the rotation amount of the conveying roller. Further, another encoder is also disclosed in which a magnetic disk having a magnetic pole pattern on its surface and a magnetic drum are rotated synchronously with a conveying roller to generate a magnetic signal corresponding to the magnetic pattern and, by detecting the magnetic signal by a magneto-resistive effect (MR) element, the rotation amount of the conveying roller is obtained (refer to, for example, Japanese Patent Laid-open Nos. 2001-74499 and 2002-206950).

In recent years, the improvement of precision in controlling the paper feed position is being demanded. The improvement of precision in controlling the paper feed position is achieved by, for example, improving detection precision by increasing the size of a medium such as a disc or a magnetic drum and accurately adjusting the rotation center axis of a conveying roller so that stabler rotating operation can be performed.

Recently, as a printer, a copying machine, and the like are being miniaturized, miniaturization of the encoder is in increasing demand. In the encoder as described above, however, the rotation amount is detected without making the sensor come into contact with a medium, so that some intervals of the slits and some dimension of the magnetic pattern are necessary to assure resolution. Therefore, the miniaturization is regulated by the medium. To miniaturize the medium, a method of arranging the medium and the sensor more closely to each other and assuring a stable interval may be employed. For this method, however, the whole conveying mechanism has to be constructed with extremely high precision. Moreover, the mechanism itself is complicated and the number of parts increases. Therefore, it is disadvantage from the cost viewpoint. Further, there is also the possibility that the method is influenced also by the dimension precision of an object to be conveyed such as paper. As a result, it is very difficult to actually realize the method.

SUMMARY OF THE INVENTION

The present invention has been achieved in consideration of such problems, and a first object of the invention is to provide a conveying mechanism capable of accurately detecting the conveyance amount of an object to be conveyed with a simple configuration.

A second object of the invention is to provide a rotation detecting mechanism suitably used in the conveying mechanism, and a head suspension assembly mounted on the rotation detecting mechanism.

The head suspension assembly of the invention includes a suspension having a pair of attachment parts and an arm which extends in a U shape or V shape so as to connect the pair of attachment parts to each other and shows elasticity in a direction orthogonal to a plane including the pair of attachment parts, and a magnetic sensor provided on the arm of the suspension. The definition of the "U shape or V shape" is not limited to a U or V letter shape but includes a shape extending so as to avoid and detour an imaginary line connecting the pair of attachment parts to each other.

In the head suspension assembly of the invention, when the pair of attachment parts are attached to fixed parts and an external force in a direction orthogonal to a plane including the pair of attachment parts is applied to the magnetic sensor, the arm of the suspension deflects in the direction in which the external force is applied. The deflection amount changes in accordance with the magnitude of the external force applied. With the change, the magnetic sensor is displaced in the deflection direction.

In the head suspension assembly of the invention, preferably, the arm shows rigidity in an in-plane direction including the pair of attachment parts. It is also preferable that the magnetic sensor be disposed at an intermediate point between the pair of attachments on the arm. The magnetic sensor has, for example, a magnetoresistive element. The magnetoresistive element may be formed of a stacked body including a plurality of ferromagnetic layers stacked in the extending direction of the arm. The expression "including a plurality of ferromagnetic layers stacked in the extending direction of the arm" denotes here that the stacking direction of the stacked body coincides with the extending direction along the U or V shape of the arm. Further, it is preferable that a face on the side opposite to a face which is in contact with the arm of the suspension in the magnetic sensor be covered with a protection film containing diamond like carbon (DLC) as an example. Preferably, the thickness of the protection film is, for example, in a range from 0.1 µm to 2.5 µm.

A rotation detecting mechanism of the invention for detecting rotation of a rotator rotatably supported by a bearing bracket includes a magnetic recording medium which is constructed so as to rotate coaxially and integrally with the rotator and has a magnetic recording surface orthogonal to a rotation axis of the rotator, and a head suspension assembly for detecting a rotation amount of the magnetic recording medium by using magnetic information recorded on the magnetic recording surface. The head suspension assembly includes a suspension having a pair of attachment parts fixed to the bearing bracket and an arm which extends in a U or V shape so as to connect the pair of the attachment parts to each other and shows elasticity in a direction orthogonal to a plane including the pair of the attachment parts, and a magnetic sensor disposed on the arm of the suspension and energized so as to be in contact with the magnetic recording surface of the magnetic recording medium by using elasticity of the arm.

In the rotation detecting mechanism of the invention, the arm of the suspension deflects in accordance with the magnitude of the external force of pressing the magnetic sensor against the magnetic recording surface of the magnetic recording medium. Consequently, at the time of rotation operation of the rotator (the magnetic recording medium), the contact state between the magnetic sensor and the recording surface can be continuously maintained relatively easily.

In the rotation detecting mechanism of the invention, it is preferable that the arm show rigidity in the in-plane direction including the pair of attachment parts. It is also preferable that the magnetic sensor be provided at an intermediate point between the pair of the attachment parts in the arm. The intermediate point is not limited to a position at strict equal distances from the pair of attachment parts but is a concept permitting an error occurring in manufacture. The magnetic sensor has, for example, a magnetoresistive element formed of a stacked body including a plurality of ferromagnetic layers stacked in the rotation direction of the magnetic recording medium. Further, in the magnetic sensor, preferably, the face which is in contact with the recording surface of the magnetic recording medium is covered with the protection film containing diamond like carbon (DLC). The thickness of the protection film is preferably in a range from $0.1\ \mu m$ to $2.5\ \mu m$.

A conveying mechanism of the invention includes a first rotator which is rotatably supported by a bearing bracket and conveys an object to be conveyed in a rotation direction by rotating around a first rotation axis, a magnetic recording medium which is constructed so as to rotate coaxially and integrally with the first rotator and has a magnetic recording surface orthogonal to the first rotation axis, and a head suspension assembly that detects the rotation amount of the magnetic recording medium by using magnetic information recorded on the magnetic recording surface. The head suspension assembly includes: a suspension having a pair of attachment parts fixed to the bearing bracket and an arm which extends in a U or V shape so as to connect the pair of attachment parts to each other while surrounding at least a part of the periphery of the first rotator and which shows elasticity in a direction orthogonal to a plane including the pair of attachment parts; and a magnetic sensor provided on the arm of the suspension and energized so as to be in contact with the magnetic recording surface of the magnetic recording medium by using elasticity of the arm. The "object to be conveyed" in the invention denotes a sheet-shaped or tape-shaped member such as a paper sheet or a film, a plate-shaped member such as a metal plate, a ceramic substrate, a resin substrate or the like, and a liner member such as a wire or rope.

In the conveying mechanism of the invention, the arm of the suspension deflects in accordance with the magnitude of an external force of pressing the magnetic sensor against the recording surface of the magnetic recording medium. Consequently, at the time of conveying operation (the time of rotation operation of the magnetic recording medium), the contact state between the magnetic sensor and the recording surface can be continuously maintained relatively easily.

Preferably, the conveying mechanism of the invention further includes an energization member that sandwiches an object to be conveyed in cooperation with the first rotator and energizes so that the first rotator comes into contact with the bearing. In the state where the magnetic sensor is energized by the energization member, the magnetic sensor may be provided along a locus drawn by a contact point between the object to be conveyed and the first rotator on the basis of a play between the first rotator and the bearing bracket. The magnetic recording medium can have, for example, an annular shape.

The head suspension assembly of the invention includes the suspension having the pair of attachment parts and the arm which extends in the U shape or V shape so as to connect the pair of attachment parts to each other and shows elasticity in the direction orthogonal to the plane including the pair of the attachment parts, and the magnetic sensor provided on the arm of the suspension. Consequently, when the pair of attachment parts are attached to fixed parts and an external force in the direction orthogonal to the plane including the pair of the attachment parts is applied to the magnetic sensor, the magnetic sensor can be displaced in accordance with the external force. Therefore, for example, in the case where the magnetic sensor is pressed against the surface of an object, the arm deflects in accordance with the magnitude of the external force of pressing. As a result, even in the case where the object fluctuates in the application direction of the external force, the contact state between the magnetic sensor and the object surface can be continuously maintained relatively easily within the range that the arm can deflect.

The rotation detecting mechanism of the invention includes the magnetic recording medium which is constructed so as to rotate coaxially and integrally with the rotator and has the magnetic recording surface orthogonal to the rotation axis of the rotator, and the head suspension assembly for detecting the rotation amount of the magnetic recording medium by using magnetic information recorded on the magnetic recording surface. The head suspension assembly includes the suspension having the pair of attachment parts fixed to the bearing bracket and the arm which extends in the U shape or V shape so as to connect the pair of attachment parts to each other and shows elasticity in the direction orthogonal to the plane including the pair of attachment parts, and the magnetic sensor provided on the arm of the suspension and energized so as to come into contact with the magnetic recording surface of the magnetic recording medium by using elasticity of the arm. Consequently, the arm of the suspension defects in accordance with the magnitude of an external force of pressing the magnetic sensor against the magnetic recording surface. Even in the case where the magnetic recording surface fluctuates in the direction of applying an external force at the time of rotation operation, if the variation is in the range where the arm is capable of be displaced, the contact state between the magnetic sensor and the magnetic recording surface can be continuously maintained relatively easily within a range that the arm can be displaced. Accordingly, magnetic information recorded on the magnetic recording surface can be precisely read and the rotation amount of the rotator can be detected with high precision.

According to the rotation detecting mechanism of the invention, particularly, when the arm shows rigidity in the in-plane direction including the pair of the attachment parts, the displacement of the magnetic sensor in the rotating direction of the rotator (magnetic recording medium) is suppressed. Consequently, the rotation amount of the rotator can be detected with high precision.

In the rotation detecting mechanism of the invention, particularly, when the magnetic sensor is provided at the intermediate point of the pair of attachment parts in the arm, the range that the displaceable range of the arm can be sufficiently utilized, so that the movable range of the magnetic sensor can be more largely assured. As a result, the position of the recording surface in the direction orthogonal to the plane including the pair of attachment parts can also sufficiently deal with the case where a larger fluctuation occurs.

The conveying mechanism of the invention includes the first rotator rotatably supported by the bearing bracket and conveying the object to be conveyed in the rotation direction by rotating around the first rotation axis, the magnetic recording medium which is constructed so as to rotate coaxially and integrally with the first rotator and has the magnetic recording surface orthogonal to the first rotation axis, and the head suspension assembly for detecting the rotation amount of the magnetic recording medium by using magnetic information recorded on the magnetic recording surface. The head suspension assembly includes the suspension having the pair of attachment parts fixed to the bearing bracket and the arm which extends in the U shape or V shape so as to connect the pair of attachment parts to each other while surrounding at least a part of the periphery of the first rotator and shows elasticity in the direction orthogonal to a plane including the pair of attachment parts, and the magnetic sensor provided on the arm of the suspension and energized so as to come into contact with the magnetic recording surface of the magnetic recording medium by using elasticity of the arm. Consequently, the arm of the suspension defects in accordance with the magnitude of an external force of pressing the magnetic sensor against the magnetic recording surface. Even in the case where the magnetic recording surface fluctuates in the direction of applying the external force at the time of conveying operation, the contact state between the magnetic sensor and the magnetic recording surface can be continuously maintained relatively easily within the range the arm can deflect. Therefore, with a simple configuration, magnetic information recorded on the magnetic recording surface can be precisely read and the rotation amount of the first rotator can be detected with high precision. When the object to be conveyed has a uniform thickness in the longitudinal direction, the conveyance amount can be precisely detected.

In particular, when the conveying mechanism of the invention further includes the energization member which sandwiches the object to be conveyed in cooperation with the first rotator and energizes so that the first rotator comes into contact with the bearing bracket, the object to be conveyed can be more properly conveyed. In the case, when the magnetic sensor is provided along the locus drawn by the contact point between the object to be conveyed and the first rotator on the basis of the play between the first rotator and the bearing bracket in the state where the magnetic sensor is energized by the energization member, the conveyance amount of the object to be conveyed can be detected more precisely.

DETAILED DESCRIPTION OF THE PREFERRED EMBODIMENTS

An embodiment of the invention will be described in detail hereinbelow with reference to the drawings.

The configuration of a conveying mechanism as an embodiment of the invention will be described with reference to FIGS. 1 to 4. The conveying mechanism of the embodiment is mounted on, for example, a printer, a copying machine or the like, and is to convey paper or the like with high precision. Since a head suspension assembly and a rotation detecting mechanism having the head suspension assembly of the invention are embodied by the conveying mechanism of the embodiment, they will be also described hereinbelow.

Figure 1:
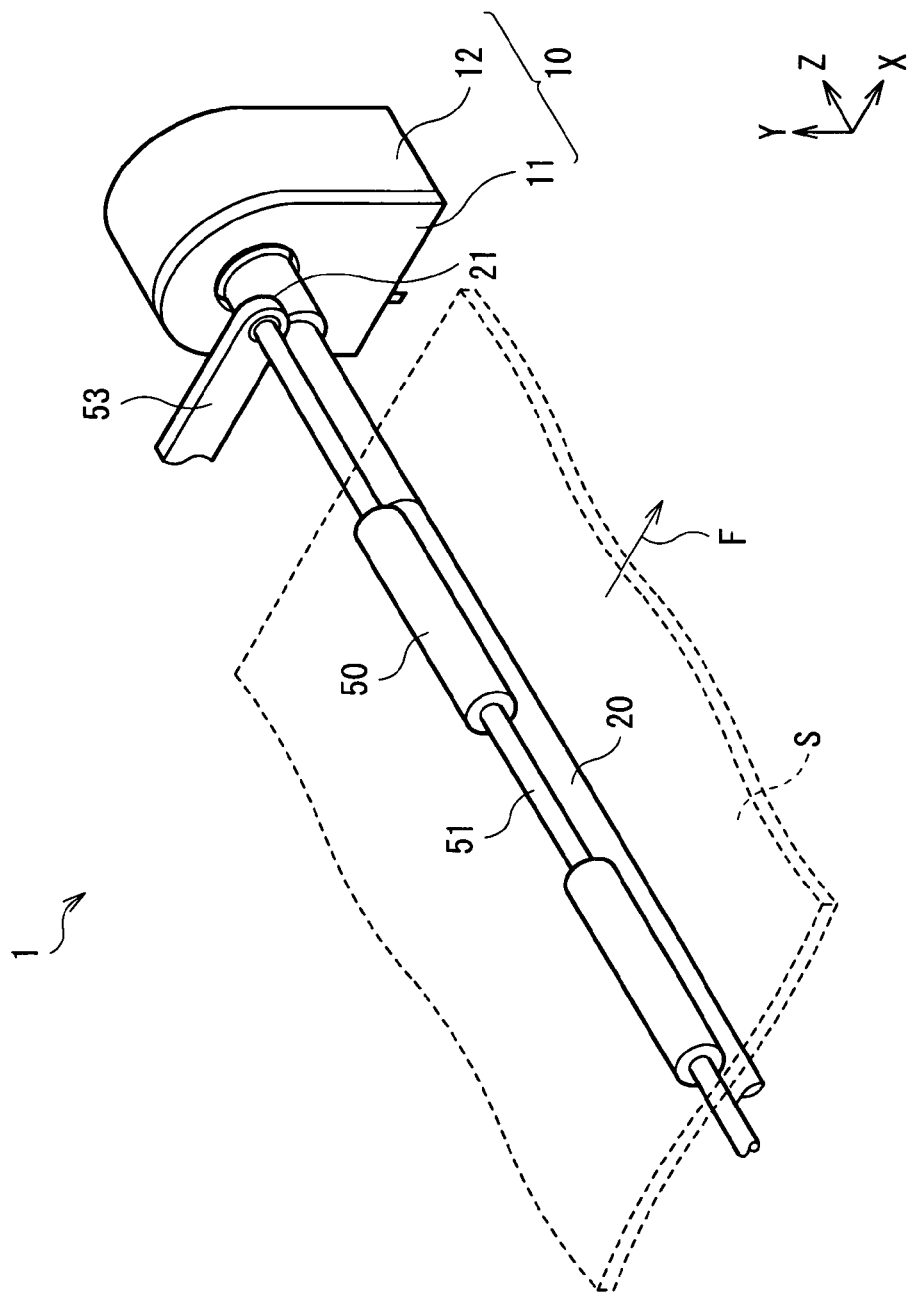
FIG. 1 is a perspective view showing an appearance configuration of a conveying mechanism according to an embodiment of the invention.
Figure 2:
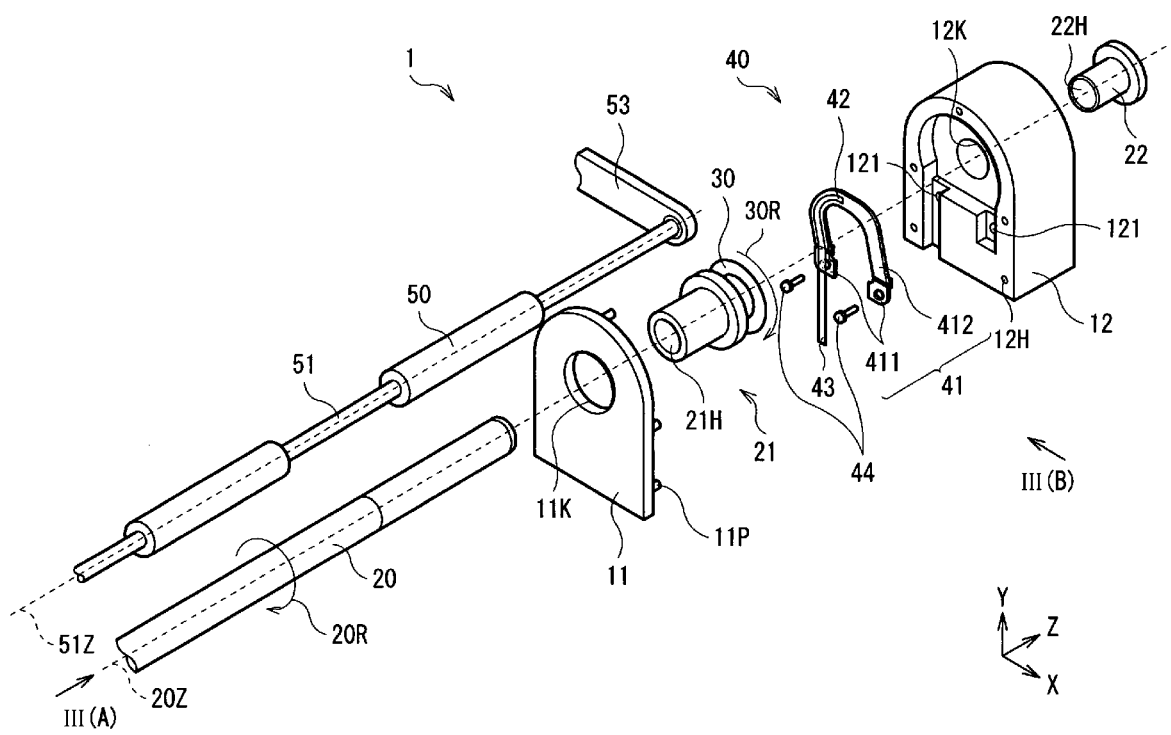
FIG. 2 is an exploded perspective view of the conveying mechanism illustrated in FIG. 1.

FIG. 1 is a perspective view showing a schematic configuration of a conveying mechanism 1 of the embodiment. FIG. 2 is an exploded perspective view corresponding to FIG. 1.

As shown in FIGS. 1 and 2, the conveying mechanism 1 of the embodiment includes: a conveying roller 20 which is rotatably supported by a bearing of a casing 10 so as to have a predetermined play and has a rotation axis 20Z extending in the Z axis direction; an annular-shaped magnetic recording medium 30 held so as to surround the conveying roller 20; and a head suspension assembly 40 for detecting the rotation amount of the magnetic recording medium 30 by using magnetic information recorded on the magnetic recording medium 30. The conveying mechanism 1 further includes a presser roller 50 sandwiching a sheet S such as a paper sheet as an object to be conveyed in cooperation with the conveying roller 20. The presser roller 50 energizes the conveying roller 20 in the −Y direction so that the conveying roller 20 comes into contact with the bearing of the casing 10.

The casing 10 includes a cover 11 and a main body 12 having openings 11K and 12K functioning as bearings, respectively. The casing 10 houses the magnetic recording medium 30 and the head suspension assembly 40 by fitting a protrusion 11P of the cover 11 in a hole 12H in the main body 12, thereby displaying the function of protecting the magnetic recording medium 30 and the suspension assembly 40 from dusts.

The conveying roller 20 is to convey the sheet S in a rotation direction 20R by its rotating operation using the rotation axis 20Z as a center axis. To an end of the conveying roller 20, a base 21 and a bushing 22 are attached. By being energized by the presser roller 50, the base 21 comes into contact with the opening 11K and the bushing 22 comes into contact with the opening 12K. The end of the conveying roller 20 extends through a hole 21H in the base 21 provided between the cover 11 and the main body 12 and further inserted into a hole 22H in the bushing 22 provided on the side opposite to the base 21 so as to sandwich the main body 12. Both of the base 21 and bushing 22 rotate around the rotation axis 20Z as a center axis integrally with the conveying roller 20.

The magnetic recording medium 30 is held on the surface orthogonal to the rotation axis 20Z in the base 21 and rotates in a rotation direction 30R around the rotation axis 20Z integrally with the conveying roller 20. On a recording surface 31 (which will described later) orthogonal to the rotation axis 20Z, magnetic information is recorded along the circumferential direction around the rotation axis 20Z.

The head suspension assembly 40 includes a suspension 41 having a pair of attachment parts 411 and an arm 412, and a magnetic sensor 42 provided on the arm 412. In the head suspension assembly 40, the pair of attachment parts 411 is fixed to a pair of attachment parts 121 in the main body 12 of the casing 10 by screws 44. The arm 412 is a plate member made of stainless steel and having a U-shape so as to surround the periphery of the conveying roller 20 and connect the pair of attachment parts 411. The arm 412 has elasticity in a direction orthogonal to a plane including the pair of attachment parts 411 (the Z axis direction along the rotation axis 20Z) and rigidity in an in-plane direction including the pair of attachment parts 411 (the rotation direction 30R of the magnetic recording medium 30). The magnetic sensor 42 is connected to a not-shown driving circuit via a flexible printed circuit (FPC) board 43 and used at the time of executing operation of reproducing magnetic information.

Figures 3A, 3B:
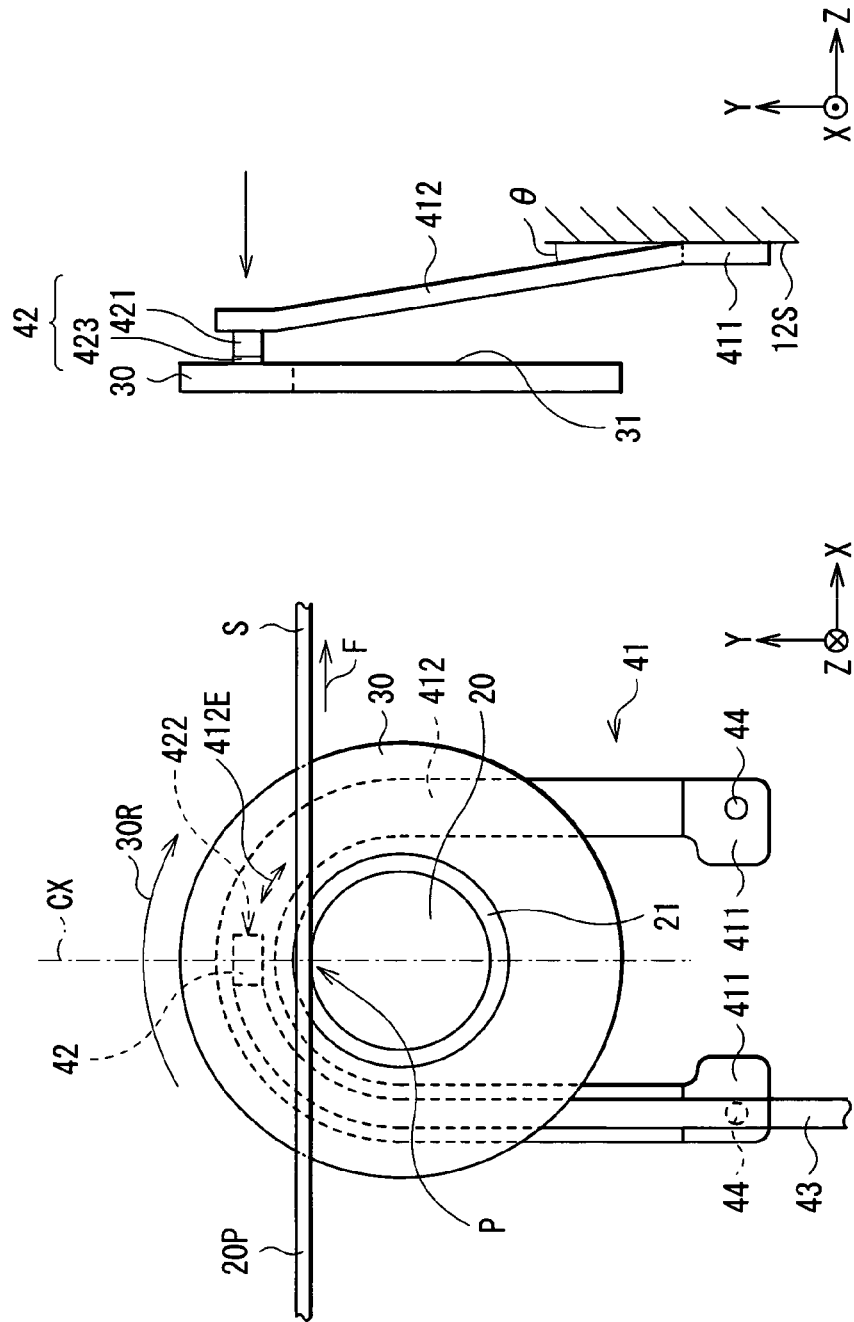
FIGS. 3A and 3B are partly enlarged views each showing the configuration of a main part of the conveying mechanism illustrated in FIG. 1.
Figure 4:
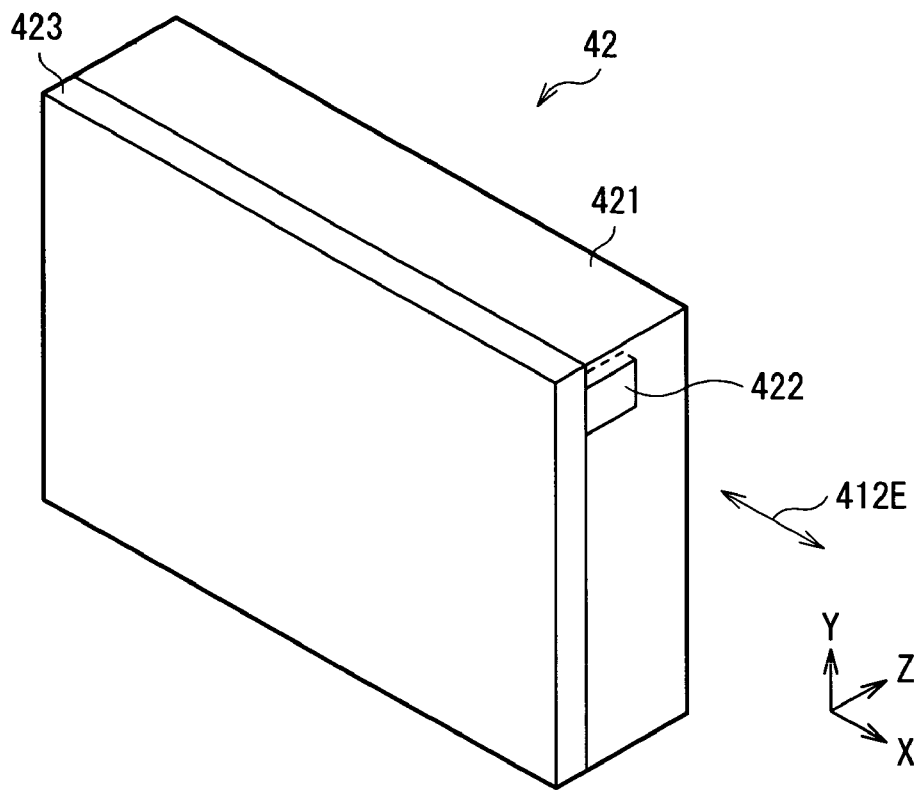
FIG. 4 is a partly enlarged view showing the configuration of another main part of the conveying mechanism illustrated in FIG. 1.

In FIGS. 3A and 3B, the magnetic recording medium 30 and the head suspension assembly 40 are enlargedly shown. FIG. 3A is a plan view seen from the direction indicated by an arrow III(A) along the rotation axis 20Z in FIG. 2. FIG. 3B is a side view seen from the direction indicated by an arrow III(B) orthogonal to the rotation axis 20Z in FIG. 2. To facilitate distinction between the magnetic recording medium 30 and head suspension assembly 40, the cover 11, base 21, and presser roller 50 are not shown in the drawings. Further, FIG. 4 shows an enlarged perspective configuration of the magnetic sensor 42. The magnetic sensor 42 is provided at an intermediate point between the pair of attachment parts 411 in the arm 412 so as to be along a contact point P between the conveying roller 20 and the sheet S. The magnetic sensor 42 includes a slider 421 having an almost rectangular parallelepiped shape and a magnetoresistive element 422 formed in one of its side faces. The magnetoresistive element 422 is a stacked body which includes a plurality of ferromagnetic layers stacked along the rotation direction 30R of the magnetic recording medium 30 (that is, an extending direction 412E of the arm 412). One end face of the magnetoresistive element 422 is covered with a protection film 423 made of such as diamond like carbon (DLC) (refer to FIG. 4). The thickness of the protection film 423 is preferably in a range from 0.1 μm to 2.5 μm for the following reason. When the thickness of the protection film 423 is less than 0.1 μm, the protection effect in case of a damage cannot be sufficiently obtained. On the other hand, when the thickness of the protection film 423 exceeds 2.5 μm, the output of the magnetoresistive element 422 cannot be sufficiently obtained. The end face of the magnetoresistive element 422 covered with the protection film 423 is energized by elasticity of the arm 412 and is always in contact with the recording surface 31 of the magnetic recording medium 30. It is preferable to reduce the frictional force by, for example, coating the recording surface 31 with a lubricating oil. The arm 412 is tilted so as to form an angle θ with a main body surface 12S parallel to the recording surface 31 (refer: FIG. 3(B)). The angle θ is, for example, 1° to 20°.

The presser roller 50 is attached to a shaft 51 having a rotation axis 51Z (FIG. 2) so as to rotate around the rotation axis 51Z in accordance with an external force. The shaft 51 is rotatably supported by a support 53 as a bearing different from the casing 10.

In the conveying mechanism 1 constructed as described above, a conveyance amount Q of the sheet S is obtained by detecting the rotation amount of the conveying roller 20 by the magnetic sensor 42. The operation of conveying the sheet S in the conveying mechanism 1 is started by sandwiching the sheet S by the presser roller 50 and the conveying roller 20 and rotating the conveying roller 20 by a not-shown driving source such as a motor.

Figure 5:
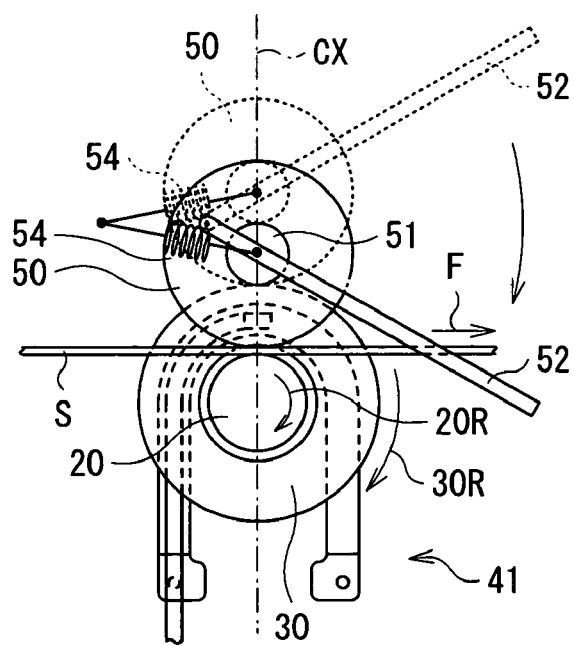
FIG. 5 is an explanatory diagram showing operation performed at the time of conveying an object to be conveyed in the conveying mechanism illustrated in FIG. 1.

Concretely, as shown in FIG. 5, an operation lever 52 coupled to the shaft 51 is tilted to the side of the conveying roller 20 and pressed to the conveying roller 20 (in the −Y direction) so as to sandwich the sheet S by the presser roller 50. In this case, the presser roller 50 and the conveying roller 20 are formed of hard rubber or the like having sufficient frictional force against the surface of the sheet S. Therefore, the sheet S is fixed if the conveying roller 20 does not rotate, so that the sheet is not moved in a conveying direction F. After this state is set, the conveying roller 20 is rotated, for example, in the rotation direction 20R, so that the sheet S is conveyed in the conveying direction F (+X direction). By detecting the rotation amount of the conveying roller 20 by the magnetic sensor 42 using magnetic information of the magnetic recording medium 30, the conveyance amount Q can be obtained.

Figures 6A, 6B, 6C:
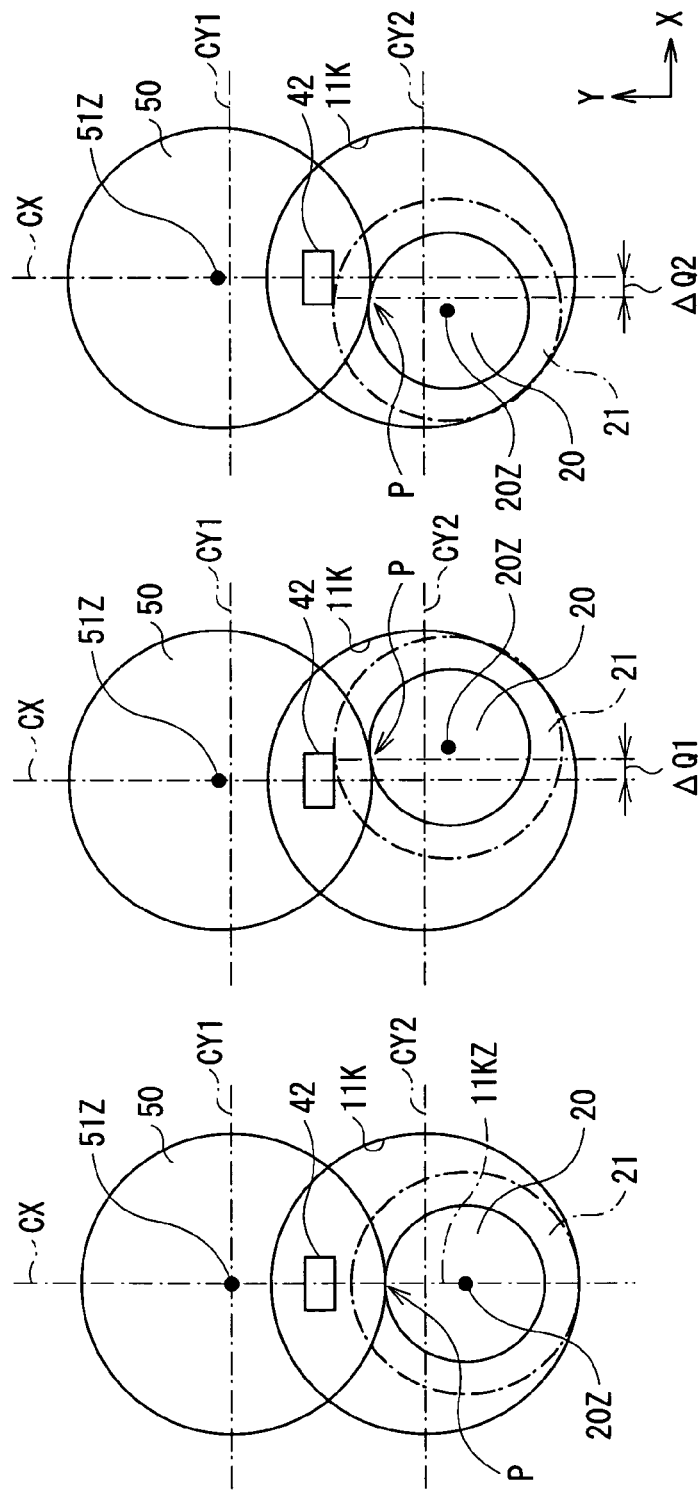
FIGS. 6A to 6C are schematic configuration diagrams showing position fluctuations of a second rotator and a bearing bracket at the time of conveying an object to be conveyed in the conveying mechanism illustrated in FIG. 1.

However, due to the predetermined play (space) between the outer peripheral surface of the base 21 attached to the conveying roller 20 and the opening 11K, in the case where the energizing force of the presser roller 50 in the −Y direction is insufficient, the conveying roller 20 may move inside the opening 11K in the XY plane without stationarily staying at a predetermined position. With the movement, the position of the contact point P varies in the XY plane. As a result, the conveyance amount Q of the sheet S in the case of using the casing 10 as a reference varies. Hereinbelow, the embodiment will be described with reference to FIGS. 6A to 6C. Each of FIGS. 6A to 6C is a schematic cross section showing the configuration of a main part of the conveying mechanism 1. FIG. 6A shows the initial state where each of components is in a reference position. FIGS. 6B and 6C show the state where the components are deviated from the reference positions due to the movement of the conveying roller 20. In FIGS. 6A to 6C, for easier understanding, only the presser roller 50, the opening 11K, the base 21, the conveying roller 20, and the magnetic sensor 42 are shown as the components, but the sheet S and the like are not shown. In FIGS. 6A to 6C, the rotation axis 51Z of the presser roller 50 and a center axis 11KZ of the opening 11K are also shown. Further, a center line CX extending in the Y axis direction passing through the center axis 11KZ, a center line CY1 extending in the X axis direction passing through the rotation axis 51Z in the reference position, and a center line CY2 extending in the X axis direction passing through the center axis 11KZ are also shown. The position of the magnetic sensor 42 relative to the opening 11K is unchanged and always exists on the center line CX.

In the initial state shown in FIG. 6A, the presser roller 50 having the rotation axis 51Z on the center line CX energizes the conveying roller 20 in the −Y direction. Consequently, the rotation axis 20Z moves from the center axis 11KZ to a position in the −Y direction. At this time, the contact point P also exists in a reference position on the center line CX. In the embodiment, the conveying direction F of the sheet S is the +X direction, so that a component along the X axis direction of the change amount of the contact point P contributes to the conveyance amount Q.

FIG. 6B shows the state where the rotation axis 20Z of the conveying roller 20 is moved in the +X direction. The outer peripheral surface of the base 21 moves while being in contact with the inner peripheral surface of the opening 11K, so that the rotation axis 20Z also changes in the +Y direction. Therefore, the presser roller 50 is pushed up in the +Y direction so as to oppose the energization in the −Y direction. In this state, the contact point P is moved only by a change amount ΔQ1

(>0) in the +X direction from the reference position (the center line CX). Therefore, the sheet S is conveyed only by the change amount ΔQ1 in the conveying direction F (+X direction).

On the other hand, FIG. 6C shows a state where the rotation axis 20Z of the conveying roller 20 moves in the −X direction opposite to the state of FIG. 6B. In this case as well, the outer peripheral surface of the base 21 moves while being in contact with the inner peripheral surface of the opening 11K, so that the rotation axis 20Z also moves in the +Y direction. Therefore, the presser roller 50 is pushed up in the +Y direction. In this state, the contact point P moves only by a change amount ΔQ2 (>0) from the reference position (the center line CX). Therefore, the sheet S is moved back in the direction (−X direction) opposite to the conveying direction F only by the change amount ΔQ2.

Figure 7:
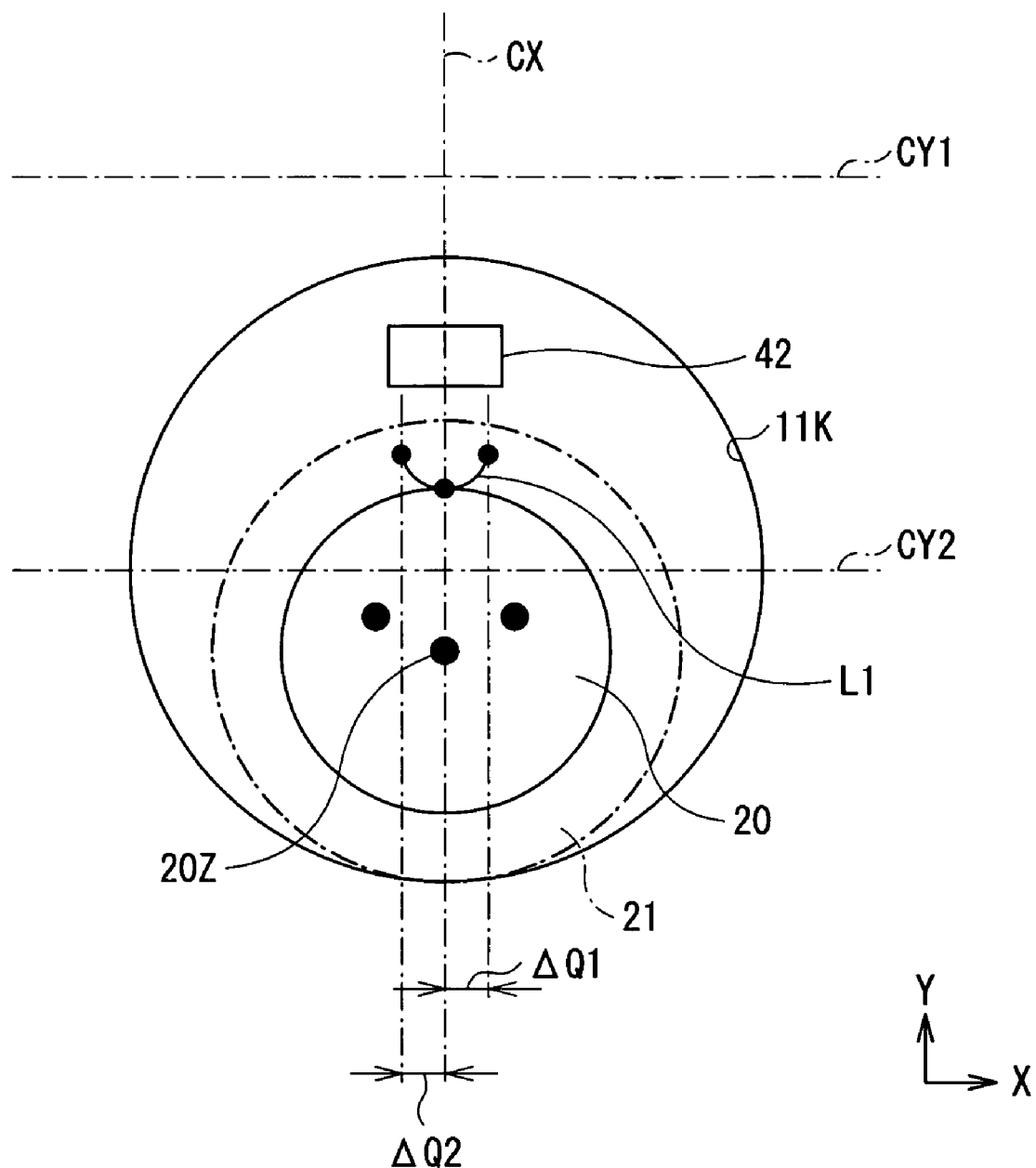
FIG. 7 is an explanatory diagram showing the locus of a contact point in correspondence with FIG. 6.

When the position of the conveying roller 20 varies in the state where the presser roller 50 is energized as shown in FIGS. 6A to 6C, a locus L1 drawn by the contact point P based on the play between the conveying roller 20 and the opening 11k becomes a curve as shown in FIG. 7.

Since the magnetic sensor 42 is disposed so as to be along the locus L1 of the contact point P as shown in FIG. 7 in the embodiment, the relative fluctuation between the opening 11K and (the rotation axis 20Z of) the conveying roller 20 can be grasped via the magnetic recording medium 30 which shares the rotation axis 20Z and rotates synchronously with the conveying roller 20. Consequently, the conveyance amount Q also including the fluctuation amount ΔQ of the contact point P can be detected. Concretely, in the state of FIG. 6B, the conveyance amount Q obtained by adding the change amount ΔQ1 (>0) to a pure conveyance amount Q0 of only the rotation of the conveying roller 20 (rotation of the magnetic recording medium 30) is detected. On the other hand, in the state of FIG. 6C, the conveyance amount Q obtained by subtracting only the change amount ΔQ2 (>0) from the pure conveyance amount Q0 is detected.

Figures 8A, 8B, 8C:
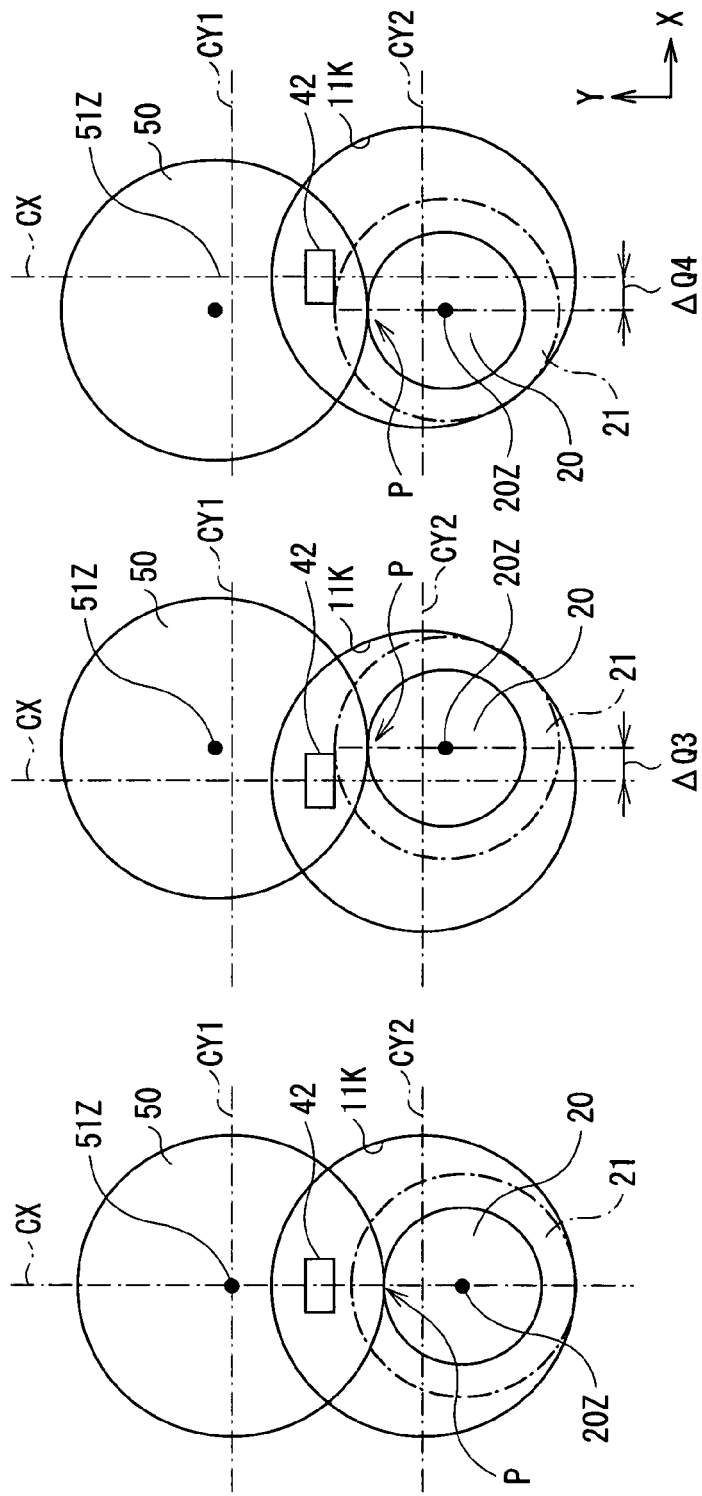
FIGS. 8A to 8C are another schematic configuration diagrams showing position fluctuations of the second rotator and the bearing at the time of conveying an object to be conveyed in the conveying mechanism illustrated in FIG. 1.

Further, in reality, the shaft 51 of the presser roller 50 also has a non-negligible play (space) with respect to the support 53 in many cases. There may be a case as shown in FIGS. 8A to 8C. FIGS. 8A to 8C are schematic cross sections each showing the configuration of a main part of the conveying mechanism 1 in a manner similar to FIGS. 6A to 6C, respectively.

Like 6A, FIG. 8A shows the initial state where the presser roller 50 having the rotation axis 51Z on the center line CX energizes the conveying roller 20 in the −Y direction. FIG. 8B shows the state where both of the rotation axes 51Z and 20Z move in the +X direction from the state of FIG. 8A. In this case, the rotation axis 51Z moves due to a play between the shaft 51 and the support 53. Similarly, the outer peripheral surface of the base 21 moves while being in contact with the inner peripheral surface of the opening 11K, so that the rotation axis 20Z shifts also in the +Y direction. Therefore, the presser roller 50 is also pushed up in the +Y direction against the energization in the −Y direction. In this state, the contact point P moves only by a change amount ΔQ3 (>0) in the +X direction from the reference position (the center line CX). On the other hand, FIG. 8C shows a state where both of the rotation axes 51Z and 20Z move in the −X direction opposite to the state of FIG. 8B. In this case as well, the outer peripheral surface of the base 21 moves being in contact with the inner peripheral surface of the opening 11K, so that the rotation axis 20Z changes also in the +Y direction. Therefore, the presser roller 50 is pushed up in the +Y direction. In this state, the contact point P moves only by a change amount Q4 (>0) in the −X direction from the reference position (the center line CX).

Figure 9:
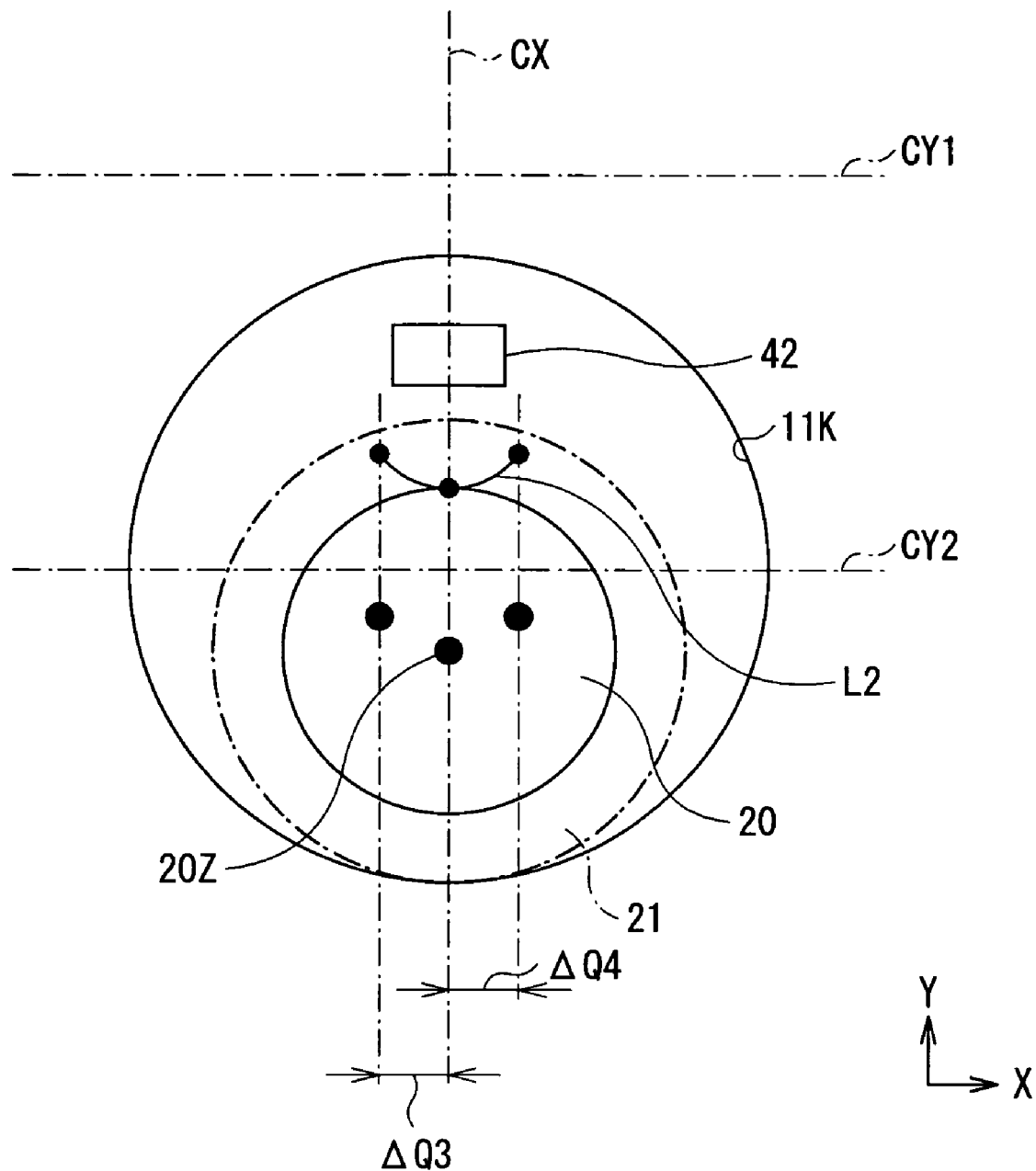
FIG. 9 is an explanatory drawing showing the locus of a contact point in correspondence with FIG. 8.

In this case (FIGS. 8A to 8C), the contact point P draws a locus L2 as shown in FIG. 9. In a manner similar to FIGS. 6A to 6C, the magnetic sensor 42 is disposed so as to be along the locus L2, so that the relative fluctuation between the opening 11K and (the rotation axis 20Z of) the conveying roller 20 can be grasped via the magnetic recording medium 30. Therefore, the conveyance amount Q also including the change amount ΔQ of the contact point P can be detected. Concretely, in the state of FIG. 8B, the conveyance amount Q obtained by adding the change amount ΔQ3 (>0) to the pure conveyance amount Q0 of only the rotation of the conveying roller 20 (rotation of the magnetic recording medium 30) is detected. On the other hand, in the state of FIG. 8C, the conveyance amount Q obtained by subtracting only the change amount ΔQ4 (>0) from the pure conveyance amount Q0 is detected.

In each of FIGS. 6 and 7, the dimension of the play is exaggerated. The dimension of the play is, actually, a tiny dimension of about one fiftieth of the diameter of the opening 11K as a reference. Therefore, as described above, when the magnetic sensor 42 is disposed on the center line CX, the change amount ΔQ of the conveyance amount with fluctuation of the contact point P can be sufficiently detected.

According to the embodiment described above, the head suspension assembly 40 includes the suspension 41 having the pair of attachment parts 411 and the arm 412 which extends in the U-shape so as to couple them and shows elasticity in the Z axis direction orthogonal to the plane including the pair of attachment parts 411, and the magnetic sensor 42 provided on the arm 412. Consequently, the arm 412 of the suspension 41 deflects along the Z axis direction in accordance with the magnitude of an external force pressing the magnetic sensor 42 against the recording surface 31 of the magnetic recording medium 30. Therefore, even in the case where the recording surface 31 slightly fluctuates in the Z axis direction at the time of the conveying operation, the contact state between the magnetic sensor 42 and the recording surface 31 can be maintained relatively easily in a range that the arm 413 can deflect. Accordingly, magnetic information recorded on the recording surface 31 can be precisely read and the rotation amount of the conveying roller 20 (the magnetic recording medium 30) can be detected with high precision. Thus, the conveyance amount Q of the sheet S can be precisely detected.

In the embodiment, the magnetic sensor 42 is fixed to the casing 10 so as to come into contact with the recording surface 31 of the magnetic recording medium 30 along the loci L1 and L2 drawn by the contact point P on the basis of the play between the conveying roller 20 and the opening 11K. Consequently, the contact point P and the magnetic sensor 42 can be disposed relatively close to each other. Therefore, the pure conveyance amount Q0 according to the rotation amount of the magnetic recording medium 30 using the contact point P as a reference can be detected. Further, the relative moving amount of the contact point P using the center axis 11KZ of the opening 11K as a reference position in association with the play can be detected with high sensitivity.

In particular, the magnetic sensor 42 is provided at the intermediate point between the pair of the attachment parts 411 in the arm 412. Consequently, the range that the arm 412 is displaceable in the Z axis direction can be sufficiently used, so that the movable range of the magnetic sensor 42 can be assured more largely. As a result, the embodiment can sufficiently deal with a case where the position of the recording surface 31 in the Z axis direction fluctuates more largely.

In the embodiment, the presser roller 50 is further included which sandwiches the sheet S in cooperation with the conveying roller 20 and energizes the conveying roller 20 so that the conveying roller 20 comes into contact with the support. Consequently, occurrence of idling of the conveying roller 20 and the like is prevented, and the sheet S can be conveyed more reliably.

Further, in the embodiment, the magnetic sensor 42 is attached to the arm 412 constructed to display rigidity in the XY plane, that is, in the plane of rotation of the magnetic recording medium 30. Therefore, without fluctuations in the position of the magnetic sensor 42 caused by friction or the like accompanying the rotation of the magnetic recording medium 30, the conveyance amount Q can be detected with higher precision.

Since the protection film 423 is provided on the side which comes into contact with the recording surface 31, of the magnetic sensor 42 in the embodiment, degradation in detection ability caused by the friction with the magnetic recording medium 30 and the like can be suppressed.

Although the invention has been described above by the embodiment, the invention is not limited to the foregoing embodiment but can be variously modified. For example, although a sheet such as paper is used as an object to be conveyed as an example in the embodiment, the invention is not limited to the sheet. The invention can be also applied to the case of conveying not only a plate member or a tape member made of a metal, a resin, or the like and having a predetermined length but also a liner member.

Figure 10:
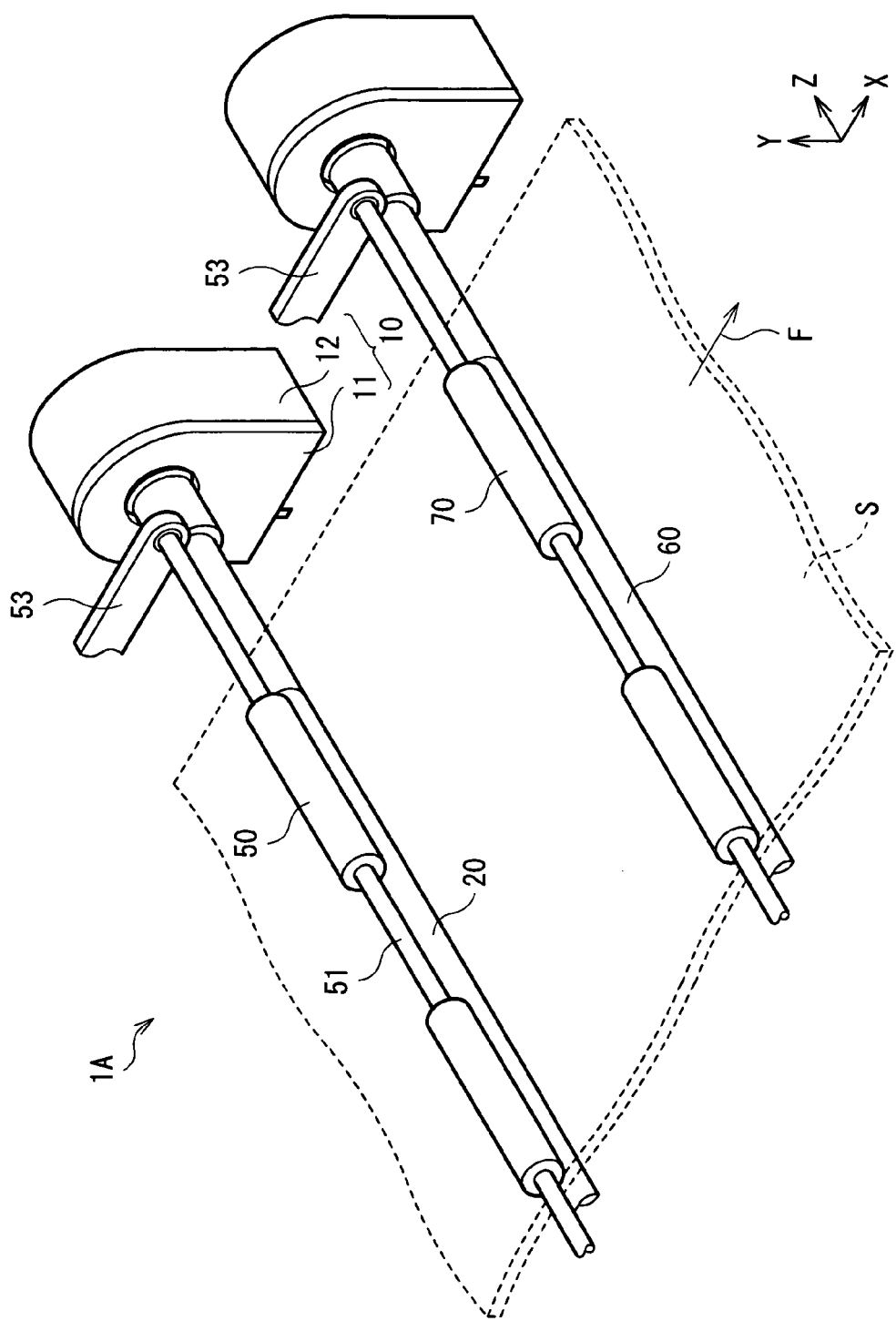
FIG. 10 is a perspective view showing an appearance configuration of a modification of the conveying mechanism according to the embodiment of the invention.

In the embodiment, the operation of conveying the sheet S is performed by rotating the conveying roller 20 by a driving source such as a motor. However, the invention is not limited to the case of driving the conveying roller 20 itself. For example, like a conveying mechanism 1A as a modification shown in FIG. 10, it is also possible to provide a driving roller 60 having a driving force and a presser roller 70 sandwiching the sheet S in cooperation with the driving roller 60 as separate members to convey the sheet S, rotates the conveying roller 20 by using friction with the sheet S, and detect the conveyance amount Q of the sheet S. Alternately, the presser roller 50 may be driven in the conveying mechanism 1 in FIG. 1.

The applications of the head suspension assembly, rotation detecting mechanism, and conveying mechanism of the invention are not limited to a printer, a copying machine, and the like whose object to be conveyed is a paper sheet as an object to be conveyed but can be also a printer for printing data onto various kinds of sheets and films made of a material other than paper, such as a resin.

What is claimed is:

1. A head suspension assembly comprising:
a suspension having a pair of attachment parts attached to a body and an arm which extends in a U shape so as to connect the pair of attachment parts to each other such that the arm extends so as to surround a rotation axis of a rotator, and the arm shows elasticity in a direction orthogonal to a plane including the pair of attachment parts; and
a magnetic sensor provided on the arm.

2. A head suspension assembly according to claim 1, wherein the arm shows rigidity in an in-plane direction including the pair of attachment parts.

3. A head suspension assembly according to claim 1, wherein the magnetic sensor is provided at an intermediate point between the pair of attachment parts in the arm.

4. A head suspension assembly according to claim 1, wherein the magnetic sensor has a magnetoresistive element.

5. A head suspension assembly according to claim 4, wherein the magnetoresistive element is a stacked body which includes a plurality of ferromagnetic layers stacked in an extending direction of the arm.

6. A head suspension assembly according to claim 1, wherein a face of the magnetic sensor opposite to a face being in contact with the arm is covered with a protection film.

7. A head suspension assembly according to claim 6, wherein the protection film contains diamond like carbon (DLC).

8. A head suspension assembly according to claim 6, wherein the protection film has a thickness in a range from 0.1 μm to 2.5 μm.

9. A rotation detecting mechanism for detecting rotation of a rotator which is rotatably supported by a bearing bracket, comprising:
a magnetic recording medium which is constructed so as to rotate coaxially and integrally with the rotator and has a magnetic recording surface orthogonal to a rotation axis of the rotator; and
a head suspension assembly for detecting a number of rotations of the magnetic recording medium by using magnetic informations recorded on the magnetic recording surface,
wherein the head suspension assembly comprises:
a suspension having a pair of attachment parts fixed to the bearing bracket; and an arm which extends in a U shape so as to connect the pair of attachment parts to each other such that the arm extends so as to surround the rotation axis of the rotator, and the arm shows elasticity in a direction orthogonal to a plane including the pair of attachment parts; and
a magnetic sensor provided on the arm and energized so as to be in contact with the magnetic recording surface of the magnetic recording medium by using the elasticity of the arm.

10. A rotation detecting mechanism according to claim 9, wherein the arm shows rigidity in an in-plane direction including the pair of attachment parts.

11. A rotation detecting mechanism according to claim 9, wherein the magnetic sensor is provided at an intermediate point between the pair of attachment parts in the arm.

12. A rotation detecting mechanism according to claim 9, wherein the magnetic sensor has a magnetoresistive element as a stacked body including a plurality of ferromagnetic layers stacked in a rotation direction of the magnetic recording medium.

13. A rotation detecting mechanism according to claim 9, wherein a face of the magnetic sensor opposite to a face being in contact with the arm is covered with a protection film.

14. A rotation detecting mechanism according to claim 13, wherein the protection film contains diamond like carbon (DLC).

15. A rotation detecting mechanism according to claim 13, wherein the protection film has a thickness in a range from 0.1 μm to 2.5 μm.

16. A rotation detecting mechanism according to claim 9, wherein the magnetic recording medium has an annular shape.

17. A conveying mechanism comprising:
a first rotator rotatably supported by a bearing bracket, and conveying an object to be conveyed in a rotation direction by rotating around a first rotation axis;
a magnetic recording medium which is constructed so as to rotate coaxially and integrally with the first rotator and has a magnetic recording surface orthogonal to the first rotation axis; and a head suspension assembly for detecting a number of rotations of the magnetic recording medium by using magnetic information recorded on the magnetic recording surface, wherein the head suspension assembly comprises:

an arm which extends in a U shape so as to connect a pair of attachment parts to each other while surrounding the first rotation axis of at least a part of the periphery of the first rotator, and the arm shows elasticity in a direction orthogonal to a plane including the pair of attachment parts; and a magnetic sensor provided on the arm and energized so as to be in contact with the magnetic recording surface of the magnetic recording medium by using elasticity of the arm.

18. A conveying mechanism according to claim 17, further comprising an energization member which sandwiches the object to be conveyed in cooperation with the first rotator, and energizes so that the first rotator comes into contact with the bearing bracket.

19. A conveying mechanism according to claim 18, wherein the energization member is a second rotator which rotates around a second rotation axis different from the first rotation axis and conveys the object to be conveyed in a rotation direction in cooperation with the first rotator.

20. A conveying mechanism according to claim 19, wherein either the first rotator or second rotator rotates by its driving force.

21. A conveying mechanism according to claim 17, wherein the magnetic sensor is disposed along a locus of the contact point between the object to be conveyed and the first rotator, drawn on the basis of a play between the first rotator and the bearing bracket in the state where the magnetic sensor is energized by the energization member.

22. A conveying mechanism according to claim 17, wherein the magnetic recording medium has an annular shape.

\* \* \* \* \*